(12) United States Patent
Hashiguchi et al.

(10) Patent No.: US 12,212,721 B2
(45) Date of Patent: Jan. 28, 2025

(54) POST-PROCESSING DEVICE AND PRINTING DEVICE

(71) Applicant: SEIKO EPSON CORPORATION, Tokyo (JP)

(72) Inventors: Namiki Hashiguchi, Shiojiri (JP); Kohei Ueno, Matsumoto (JP); Hirohisa Kodaira, Shiojiri (JP); Toshikazu Kotaka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 189 days.

(21) Appl. No.: 17/651,469

(22) Filed: Feb. 17, 2022

(65) Prior Publication Data

US 2022/0272221 A1    Aug. 25, 2022

(30) Foreign Application Priority Data

Feb. 19, 2021    (JP) .................... 2021-024946

(51) Int. Cl.
*H04N 1/00* (2006.01)
*B26F 1/04* (2006.01)

(52) U.S. Cl.
CPC .......... *H04N 1/00639* (2013.01); *B26F 1/04* (2013.01)

(58) Field of Classification Search
USPC ...................................... 358/1.15
See application file for complete search history.

(56) References Cited

U.S. PATENT DOCUMENTS

| 6,397,122 B1* | 5/2002 | Lindstrom ....... G05B 19/41875 700/145 |
| 8,011,281 B2 | 9/2011 | Hidaka et al. |
| 2008/0236351 A1 | 10/2008 | Hidaka et al. |
| 2010/0329755 A1* | 12/2010 | Obuchi ............. B26F 1/14 399/361 |
| 2014/0093298 A1* | 4/2014 | Nakamura ........ G03G 15/6582 83/72 |
| 2015/0309464 A1* | 10/2015 | Kubota ............... B26D 7/1818 83/123 |
| 2018/0015740 A1* | 1/2018 | Kodama ............... B65H 29/70 |

FOREIGN PATENT DOCUMENTS

| CN | 101264607 | 9/2008 |
| JP | 2012-201430 A | 10/2012 |
| JP | 2017-019594 A | 1/2017 |

* cited by examiner

*Primary Examiner* — Jacky X Zheng
(74) *Attorney, Agent, or Firm* — WORKMAN NYDEGGER

(57) ABSTRACT

A post-processing unit includes a punch unit that punches a paper on which recording is performed by a recording unit that discharges ink, and a controller that controls a punching operation of the punch unit. The controller sets at least one of the number of punching and a punching speed per paper in the punch unit based on setting information of at least one of recording information and environmental information in the recording unit.

18 Claims, 11 Drawing Sheets

FIG. 7

| DEVICE ITEM | TARGET |
|---|---|
| RECORDING SURFACE 1 | SINGLE-SIDED |
| RECORDING SURFACE 2 | DOUBLE-SIDED |
| THICKNESS 1 | 75 g/m² OR LESS |
| THICKNESS 2 | GREATER THAN 75 g/m² AND 90 g/m² OR LESS |
| THICKNESS 3 | GREATER THAN 90 g/m² |
| GRAIN DIRECTION 1 | LONG GRAIN |
| GRAIN DIRECTION 2 | SHORT GRAIN |
| SIZE 1 | 216 mm OR LESS |
| SIZE 2 | LONGER THAN 216 mm |
| TEMPERATURE 1 | 10°C OR MORE AND LESS THAN 18°C |
| TEMPERATURE 2 | 18°C OR MORE AND LESS THAN 25°C |
| TEMPERATURE 3 | 25°C OR MORE AND 35°C OR LESS |
| TEMPERATURE 4 | OTHER |
| HUMIDITY 1 | 15% OR MORE AND LESS THAN 35% |
| HUMIDITY 2 | 35% OR MORE AND LESS THAN 45% |
| HUMIDITY 3 | 45% OR MORE AND 85% OR LESS |
| HUMIDITY 4 | OTHER |
| PERFORATION PORTION ITEM | SETTING PARAMETER |
| NUMBER OF PERFORATIONS 1 | ONCE |
| NUMBER OF PERFORATIONS 2 | TWO TIMES |
| NUMBER OF PERFORATIONS 3 | THREE TIMES |
| NUMBER OF PERFORATIONS 4 | FOUR TIMES |
| PERFORATION SPEED 1 | 1X SPEED |
| PERFORATION SPEED 2 | 2X SPEED |

FIG. 8

| RECORDING DENSITY [%] | NUMBER OF PERFORATIONS | PERFORATION SPEED |
|---|---|---|
| 0 OR MORE AND LESS THAN 10 | 1 | 1×SPEED |
| 10 OR MORE AND LESS THAN 20 | 1 | 1×SPEED |
| 20 OR MORE AND LESS THAN 30 | 1 | 1×SPEED |
| 30 OR MORE AND LESS THAN 40 | 2 | 2×SPEED |
| 40 OR MORE AND LESS THAN 50 | 2 | 2×SPEED |
| 50 OR MORE AND LESS THAN 60 | 2 | 2×SPEED |
| 60 OR MORE AND LESS THAN 70 | 2 | 2×SPEED |
| 70 OR MORE AND LESS THAN 80 | 3 | 2×SPEED |
| 80 OR MORE AND LESS THAN 90 | 3 | 2×SPEED |
| 90 OR MORE AND LESS THAN 100 | 3 | 2×SPEED |
| 100 OR MORE | 3 | 2×SPEED |

FIG. 9

| RECORDING DENSITY [%] | NUMBER OF PERFORATIONS | PERFORATION SPEED |
| --- | --- | --- |
| 0 OR MORE AND LESS THAN 10 | 1 | 1×SPEED |
| 10 OR MORE AND LESS THAN 20 | 1 | 1×SPEED |
| 20 OR MORE AND LESS THAN 30 | 1 | 1×SPEED |
| 30 OR MORE AND LESS THAN 40 | 2 | 2×SPEED |
| 40 OR MORE AND LESS THAN 50 | 2 | 2×SPEED |
| 50 OR MORE AND LESS THAN 60 | 2 | 2×SPEED |
| 60 OR MORE AND LESS THAN 70 | 2 | 2×SPEED |
| 70 OR MORE AND LESS THAN 80 | 3 | 2×SPEED |
| 80 OR MORE AND LESS THAN 90 | 4 | 2×SPEED |
| 90 OR MORE AND LESS THAN 100 | 4 | 2×SPEED |
| 100 OR MORE | 4 | 2×SPEED |

POST-PROCESSING DEVICE AND PRINTING DEVICE

The present application is based on, and claims priority from JP Application Serial Number 2021-024946, filed Feb. 19, 2021, the disclosure of which is hereby incorporated by reference herein in its entirety.

BACKGROUND

1. Technical Field

The present disclosure relates to a post-processing device and a printing device.

2. Related Art

In a sheet processing device of JP-A-2012-201430, the larger a basis weight of a sheet, the faster a moving speed of a punch blade.

In the sheet processing device of JP-A-2012-201430, the rigidity of the sheet, which changes depending on printing or an environment, is not taken into consideration. Here, when the rigidity of the sheet against a force in a punching direction is reduced due to the change in the amount of water in the sheet depending on the printing or the environment, there is a risk that a punching performed on the sheet will be insufficient, resulting in poor punching of the sheet.

SUMMARY

In order to solve the above problems, a post-processing device according to the present disclosure includes a punching portion that punches a medium on which recording is performed by a recording portion that discharges a liquid, and a controller that controls a punching operation of the punching portion, in which the controller sets at least one of the number of punching and a punching speed per medium in the punching portion based on setting information of at least one of information on the medium related to a rigidity of the medium, recording information in the recording portion, and environmental information.

In order to solve the above problems, a printing device according to the present disclosure includes the post-processing device, and the recording portion that performs recording on the medium to be transported to the post-processing device.

BRIEF DESCRIPTION OF THE DRAWINGS

FIG. 7 is a table illustrating each parameter set in the recording system according to the first embodiment.

FIG. 8 is a table illustrating punching parameters when recording is performed only on a first surface in the recording system according to the first embodiment.

FIG. 9 is a table illustrating punching parameters when recording is performed on a first surface and a second surface in the recording system according to the first embodiment.

DESCRIPTION OF EXEMPLARY EMBODIMENTS

Figure 1:
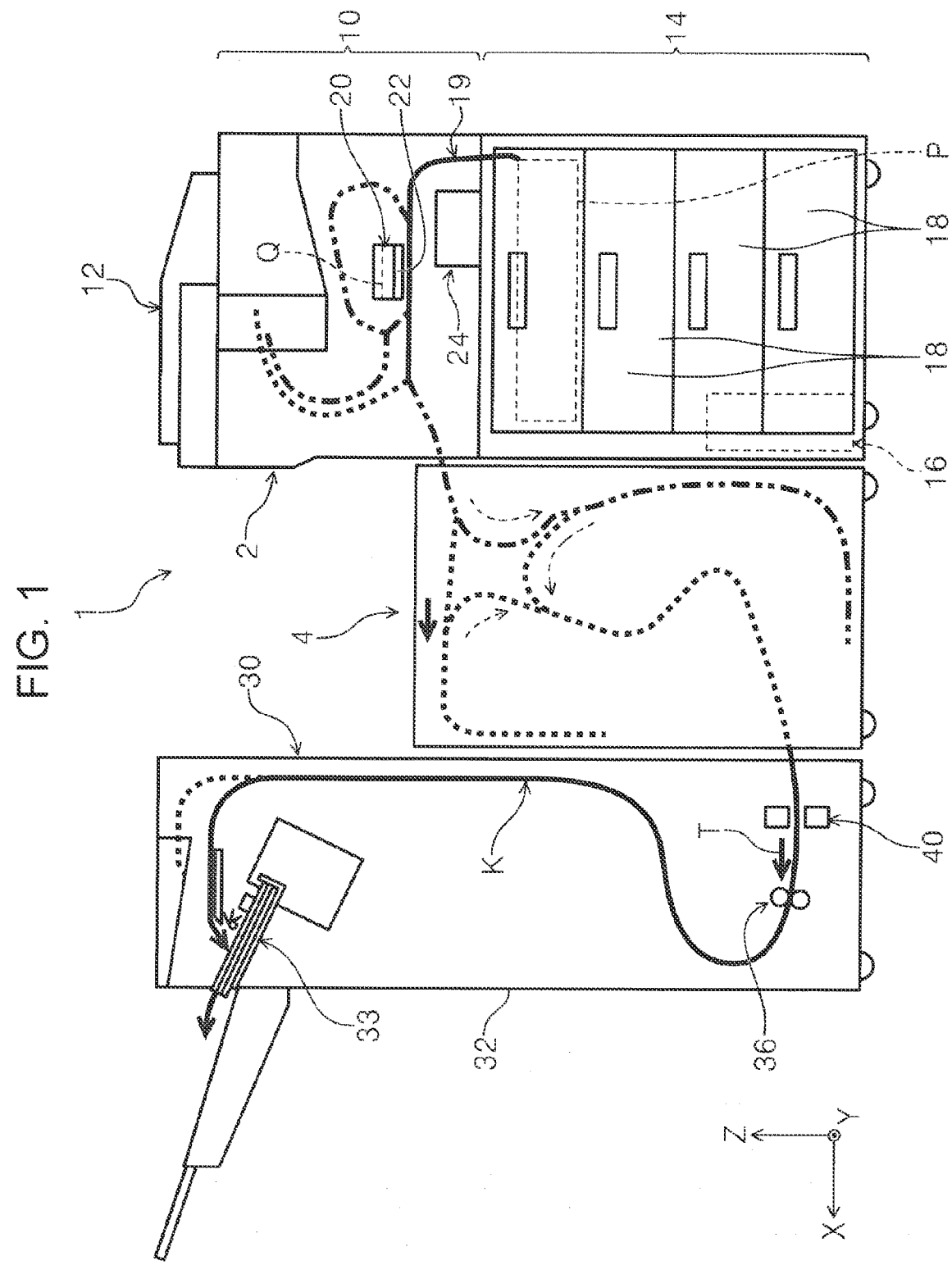
FIG. 1 illustrates a transport path of paper in a recording system according to a first embodiment.

Hereinafter, first to sixteenth aspects of the present disclosure will be schematically described.

A post-processing device according to a first aspect includes a punching portion that punches a medium on which recording is performed by a recording portion that discharges a liquid, and a controller that controls a punching operation of the punching portion, in which the controller sets at least one of the number of punching and a punching speed per medium in the punching portion based on setting information of at least one of information on the medium related to a rigidity of the medium, recording information in the recording portion, and environmental information.

According to the present aspect, since holes are likely to be formed in the medium by setting at least one of the number of punching and the punching speed according to the rigidity of the medium, for example, by increasing the number of punching or the punching speed even in the medium having reduced rigidity, poor punching in the medium can be suppressed.

In a post-processing device according to a second aspect, in the first aspect, the recording information includes information on a recording density of a scheduled punching area in the medium, and the controller sets at least one of the number of punching and the punching speed based on the information on the recording density.

When the recording density is high, the amount of liquid attached to the medium increases. When the recording density is low, the amount of liquid attached to the medium is reduced.

Here, according to the present aspect, since punching can be performed according to the amount of liquid in the medium by setting at least one of the number of punching and the punching speed based on the recording density, poor punching in the medium can be suppressed.

In a post-processing device according to a third aspect, in the second aspect, when the punching portion performs punching for a plurality of the scheduled punching areas, the controller sets at least one of the number of punching and the punching speed based on the highest recording density among recording densities in the scheduled punching areas.

According to the present aspect, since at least one of the number of punching and the punching speed is set according to a position where poor punching is most likely to occur, the poor punching in the medium can be suppressed.

In a post-processing device according to a fourth aspect, in the second aspect, when recording is performed by the recording portion on a first surface and a second surface opposite to the first surface of the medium, the controller sets at least one of the number of punching and the punching speed, based on an average value of a first recording density in the scheduled punching area on the first surface and a second recording density in the scheduled punching area on the second surface.

According to the present aspect, since at least one of the number of punching and the punching speed is set based on not only the first recording density of the first surface but also the second recording density of the second surface, the poor punching in the medium can be suppressed compared with a configuration in which the punching is performed based only on the first recording density.

In a post-processing device according to a fifth aspect, in the fourth aspect, when the punching portion performs punching for a plurality of the scheduled punching areas, the controller sets at least one of the number of punching and the punching speed based on the highest average value among a plurality of the average values.

According to the present aspect, since at least one of the number of punching and the punching speed is set based on the average value of the recording density at a position where poor punching is most likely to occur, the poor punching in the medium can be suppressed.

In a post-processing device according to a sixth aspect, in the fourth aspect or the fifth aspect, when the average value in the scheduled punching area is higher than a predetermined value, the controller increases at least one of the number of punching and the punching speed.

According to the present aspect, since at least one of the number of punching and the punching speed is increased when the average value of the recording densities is high and there is a high possibility that the poor punching occurs, the poor punching in the medium can be suppressed.

In a post-processing device according to a seventh aspect, in the second aspect or the third aspect, when the recording density in the scheduled punching area is higher than a predetermined value, the controller increases at least one of the number of punching and the punching speed.

According to the present aspect, since at least one of the number of punching and the punching speed is increased even when the possibility that the poor punching occurs increases due to the increase in the recording density, the poor punching can be suppressed.

In a post-processing device according to an eighth aspect, in the sixth aspect or the seventh aspect, the controller increases the number of punching and the punching speed.

According to the present aspect, when productivity is reduced due to the increase in the number of punching, the productivity can be maintained by increasing the punching speed, so that the number of punching can be increased while maintaining the productivity.

In a post-processing device according to a ninth aspect, in any one of the first aspect to the eighth aspect, the controller uses at least one of temperature and humidity as the environmental information.

According to the present aspect, by using at least one of temperature and humidity as the environmental information, the poor punching can be further suppressed.

In a post-processing device according to a tenth aspect, in any one of the first aspect to the ninth aspect, the controller uses a thickness of the medium as information on the medium.

According to the present aspect, by using the thickness of the medium as the information on the medium, the poor punching can be further suppressed.

In a post-processing device according to an eleventh aspect, in the tenth aspect, the controller reduces at least one of the number of punching and the punching speed when the thickness of the medium to be punched is equal to or greater than a predetermined thickness, and increases at least one of the number of punching and the punching speed when the thickness of the medium to be punched is thinner than the predetermined thickness.

According to the present aspect, by setting at least one of the number of punching and the punching speed in consideration of the thickness of the medium, the poor punching can be further suppressed.

In a post-processing device according to a twelfth aspect, in any one of the first aspect to the eleventh aspect, the medium has a long grain or a short grain, and the controller uses a grain direction of the medium as information on the medium.

According to the present aspect, by using the grain direction of the medium, the poor punching can be further suppressed.

In a post-processing device according to a thirteenth aspect, in the twelfth aspect, the punching portion has a blade portion that is rotatably provided and extends in one direction when viewed in a punching direction, and a driving portion that rotates the blade portion, and the controller rotates the blade portion by the driving portion so that the one direction and the grain direction intersect.

According to the present aspect, since the medium is easily cut by intersecting the grain direction and the one direction of the blade portion, the poor punching can be further suppressed.

In a post-processing device according to a fourteenth aspect, in any one of the first aspect to the thirteenth aspect, the recording portion is configured to perform single-sided printing in which printing is performed on the first surface or the second surface opposite to the first surface of the medium by the recording portion, and double-sided printing in which recording is performed on both the first surface and the second surface, the single-sided printing or the double-sided printing is selected as the recording information, and the controller increases at least one of the number of punching and the punching speed when the double-sided printing is performed as compared to at least one of the number of punching and the punching speed when the single-sided printing is performed.

According to the present aspect, by setting at least one of the number of punching and the punching speed in consideration of the information on the recording surface as the recording information, the poor punching can be further suppressed.

In a post-processing device according to a fifteenth aspect, in any one of the first aspect to the fourteenth aspect, the controller is configured to switch from one of a first punching mode and a second punching mode to another of the first punching mode and the second punching mode, when the mode is switched to the first punching mode, the controller changes a setting of at least one of the number of punching and the punching speed based on the setting information, and when the mode is switched to the second punching mode, the controller does not change settings of the number of punching and the punching speed.

According to the present aspect, for example, when the user prioritizes high productivity over quality of punching, it is possible to prevent a decrease in productivity by switching the mode to the second punching mode.

A printing device according to a sixteenth aspect includes the post-processing device according to any one of the first aspect to the fifteenth aspect, and the recording portion that performs recording on the medium to be transported to the post-processing device.

According to the present aspect, the same action and effect as any one of the first aspect to the fifteenth aspect can be obtained.

Hereinafter, an example of the post-processing device and the printing device according to the present disclosure will be specifically described.

First Embodiment

FIG. 1 illustrates a recording system 1 which is an example of a printing device. The recording system 1 is configured as an ink jet device that preforms recording by discharging ink Q, which is an example of a liquid, onto paper P, which is an example of a medium.

The paper P is formed in a rectangular shape having a long side and a short side. Further, as an example, the paper P has a long grain in which fibers flow along the long side. The grain direction of the paper P is not limited to the long grain, but may be a short grain. Information on the grain direction is set in a manipulation portion 15 (FIG. 2) described later.

In an X-Y-Z coordinate system represented in each figure, an X direction is a width direction of a device, a Y direction is a depth direction of a device, and a Z direction is a height direction of a device. The X direction, the Y direction, and the Z direction are orthogonal to each other. The Y direction is an example of a width direction of the paper P. The Z direction is an example of a punching direction. When the recording system 1 is viewed from the front and the left and the right are distinguished with respect to the center in the width direction of the device, the left is a +X direction side and the right is a −X direction side. When the front and the back are distinguished with respect to the center in the depth direction of the device, the front is a +Y direction side and the back is a −Y direction side. When the upper side and the lower side are distinguished with respect to the center in the height direction of the device, the upper side is a +Z direction side and the lower side is a −Z direction side.

The recording system 1 has a recording unit 2, an intermediate unit 4, and a post-processing unit 30 in this order in the +X direction. In the recording system 1, the recording unit 2, the intermediate unit 4, and the post-processing unit 30 are mechanically and electrically coupled to each other. The intermediate unit 4 transports the paper P fed from the recording unit 2 to the post-processing unit 30. The recording system 1 is configured to perform post-processing described later on the paper P on which information is recorded in an image forming portion 10 described later. A path through which the paper P is transported in the recording system 1 is defined as a transport path K.

The recording system 1 may further include a manipulation portion 15 (FIG. 2) manipulated by the user and a display portion 17 (FIG. 2) on which various pieces of information of the recording system 1 is displayed. In the present embodiment, as an example, the manipulation portion 15 and the display portion 17 are provided in the recording unit 2.

As an example, the manipulation portion 15 and the display portion 17 are configured as one touch panel, are configured to be able to execute a manipulation of each unit of the recording system 1, and are configured to be able to set various pieces of information. The various pieces of information include the thickness, grain direction, size, and printing surface of the paper P.

The thickness, grain direction, and size of the paper P are examples of information on the medium related to a change in rigidity of the paper P.

The transport direction of the paper P is illustrated by an arrow T. In the following description, the transport direction of the paper P is simply referred to as a transport direction. The transport direction is not constant, and an angle with respect to a horizontal direction changes depending on a position of the paper P in the transport path K.

The recording unit 2 is an example of the recording portion, and records various pieces of information on the paper P to be transported to the post-processing unit 30. The paper P is formed in the form of a sheet. Further, the recording unit 2 may include an image forming portion 10, a scanner portion 12, a cassette accommodating portion 14, a power supply 16, and a transport portion 19.

As an example, the image forming portion 10 may be configured to include a recording head 20 and a controller 24.

The scanner portion 12 reads information on a document (not illustrated). The cassette accommodating portion 14 has a plurality of accommodating cassettes 18 accommodating a plurality of papers P.

The recording head 20 is configured as a line head as an example. Further, the recording head 20 includes a discharge portion 22 including a plurality of nozzles (not illustrated). The discharge portion 22 performs recording by discharging ink Q onto the transported paper P.

Figure 2:
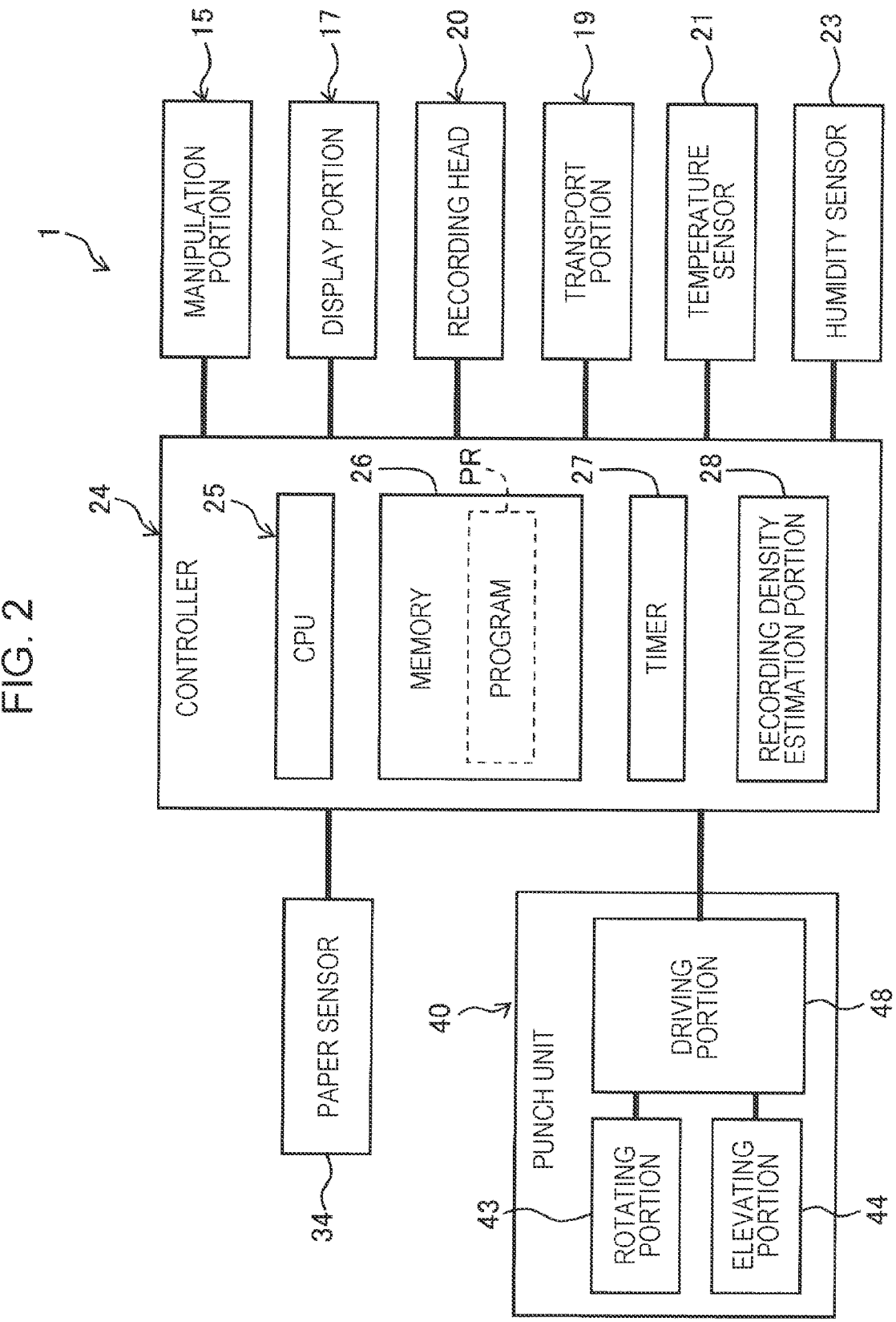
FIG. 2 is a block diagram of each configuration of the recording system according to the first embodiment.

As illustrated in FIG. 2, the controller 24 that functions as a computer includes a central processing unit (CPU) 25, a memory 26, a timer 27 that can measure time or hour based on each time point, a recording density estimation portion 28, and a storage (not illustrated). Further, the controller 24 controls various operations in each portion of the recording system 1.

The controller 24 controls a transport operation of the paper P by the transport portion 19, a recording operation on the paper P by the recording head 20, and a punching operation of the punch unit 40 based on information input to the controller 24 from the outside of the recording system 1 or from the manipulation portion 15. Further, the controller 24 controls the discharging of the ink Q in the discharge portion 22 based on image data as recording information. A specific control of the punch unit 40 by the controller 24 will be described later.

The memory 26 is an example of a storage portion and stores various types of data. Various types of data including a program PR executed by the CPU 25 are stored in the memory 26. In other words, the memory 26 is an example of a recording medium in which a computer-readable program PR is stored. Other examples of the recording medium include a compact disc (CD), a digital versatile disc (DVD), a Blu-ray disc, and a universal serial bus (USB) memory. Further, a program PR can be expanded in a part of the memory 26.

The program PR is a program for causing the CPU 25 to execute each step described later in the recording system 1.

In the present embodiment, the recording density means a ratio [unit %] of the number of dots actually printed to the maximum number of dots that can be printed with ink Q in a recordable area SA (FIG. 4) of the paper P described later. In other words, the controller 24 estimates the amount of ink Q discharged from the discharge portion 22 (FIG. 1) by estimating the recording density.

The recording density estimation portion 28 estimates the recording density based on the recording information on the scheduled punching areas SB1, SB2, SB3, and SB4 (FIG. 5) on the paper P. In the present embodiment, the information on the recording densities in the scheduled punching area SB1, SB2, SB3, and SB4 on the paper P is an example of the recording information related to the rigidity of the paper P. The scheduled punching areas SB1, SB2, SB3, and SB4 will be described later.

Figure 4:
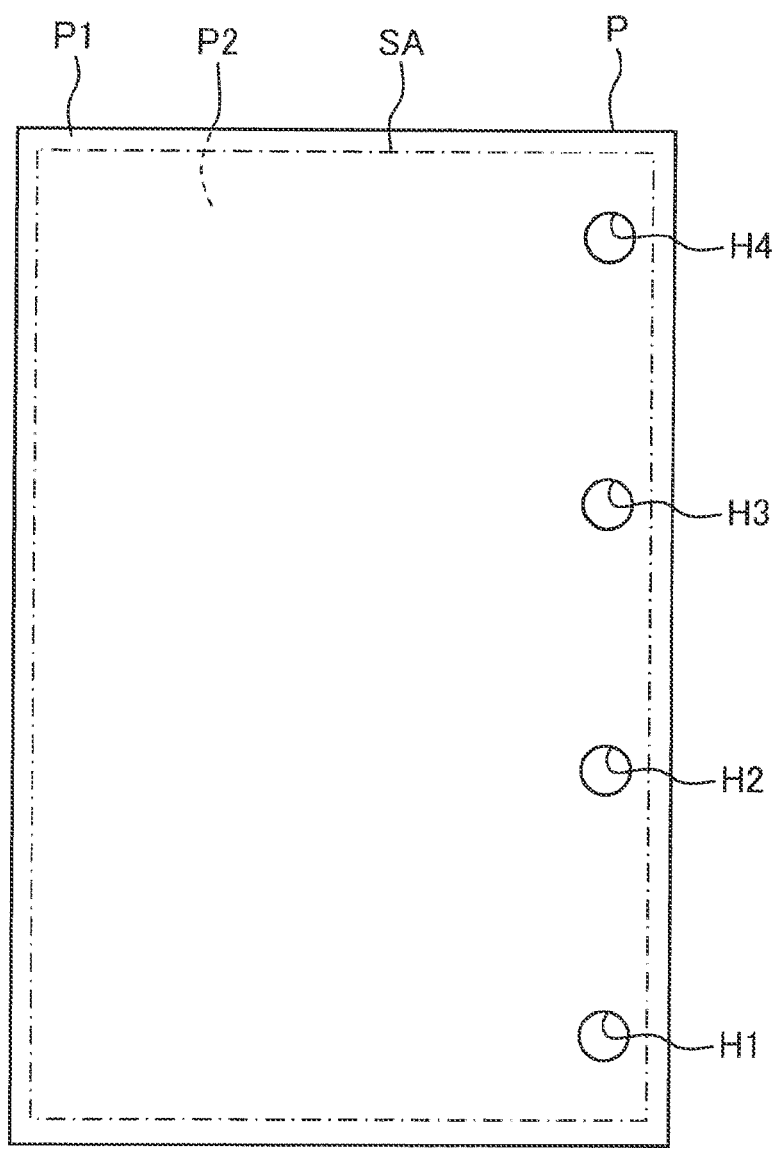
FIG. 4 is a schematic view illustrating an image formed on a paper and a punching position of the paper in the recording system according to the first embodiment.

Information on the printing surface set by the manipulation portion 15 includes information on single-sided printing and double-sided printing. The information on single-sided printing and double-sided printing is an example of the recording information. Here, one surface of the paper P is referred to as a first surface P1 (FIG. 4), and a surface opposite to the first surface P1 is referred to as a second surface P2 (FIG. 4). The single-sided printing is printing in which recording is performed on the first surface P1 or the second surface P2 by the recording unit 2. The double-sided printing is printing in which recording is performed on both the first surface P1 and the second surface P2 by the recording unit 2. In this way, the recording unit 2 can execute the single-sided printing and the double-sided printing.

In the manipulation portion 15, the single-sided printing or the double-sided printing can be selected by the user.

The recording system 1 is further provided with a temperature sensor 21 and a humidity sensor 23. The temperature sensor 21 is an example of a temperature measuring portion, and measures a temperature inside the device of the recording system 1. In the present embodiment, the temperature sensor 21 is provided inside the recording unit 2. Temperature information obtained by the temperature sensor 21 is transmitted to the controller 24.

The humidity sensor 23 is an example of a humidity measuring portion, and measures humidity inside the device of the recording system 1. In the present embodiment, the humidity sensor 23 is provided inside the recording unit 2. Humidity information obtained by the humidity sensor 23 is transmitted to the controller 24.

The temperature information and the humidity information are examples of environmental information related to the change in the rigidity of the paper P, respectively.

It should be noted that the above-mentioned medium information, recording information, and environmental information are collectively referred to as "setting information" from a viewpoint of setting the conditions for punching processing described later.

As illustrated in FIG. 1, the transport portion 19 is provided in an entirety of the recording system 1. Further, the transport portion 19 is configured to include a plurality of roller pairs (not illustrated) and a plurality of motors, and transports the paper P in the transport direction. Specifically, the transport portion 19 transports the paper P from the accommodating cassette 18 to the recording area of the recording head 20, and further transports the paper P from the recording area to the post-processing unit 30 via the intermediate unit 4.

The post-processing unit 30 is an example of the post-processing device, and is configured to include a controller 24, a housing 32, a discharge portion 33, a paper sensor 34 (FIG. 2), a punch unit 40, and a pair of transport rollers 36. As an example, the controller 24 also serves as a controller for the post-processing unit 30. The transport path K for transporting the paper P by the transport portion 19 is formed inside the housing 32. The paper P received from the intermediate unit 4 is transported along the transport path K and discharged to the discharge portion 33.

The punch unit 40 is an example of the punching portion, and punches the paper P on which recording is performed by the recording unit 2. In other words, the punch unit 40 performs shearing processing on the paper P. Further, the punch unit 40 is provided at a lower portion of the housing 32. A portion of the transport path K that faces the punch unit 40 is, for example, along the X direction. As a result, the portion to be punched in the paper P is arranged along a substantially horizontal direction.

The paper sensor 34 (FIG. 2) is provided upstream of the punch unit 40 in the transport direction. As an example, the paper sensor 34 includes an exit portion (not illustrated) and a light receiving portion (not illustrated). Then, the paper sensor 34 detects a passing time point of the paper P in the paper sensor 34 and a stop position of the paper P with respect to the punch unit 40 by determining whether or not the light from the exit portion is received by the light receiving portion.

The pair of transport rollers 36 is provided downstream of the punch unit 40 in the transport direction. The pair of transport rollers 36 is rotated to transport the paper P downstream in the transport direction.

Figure 3:
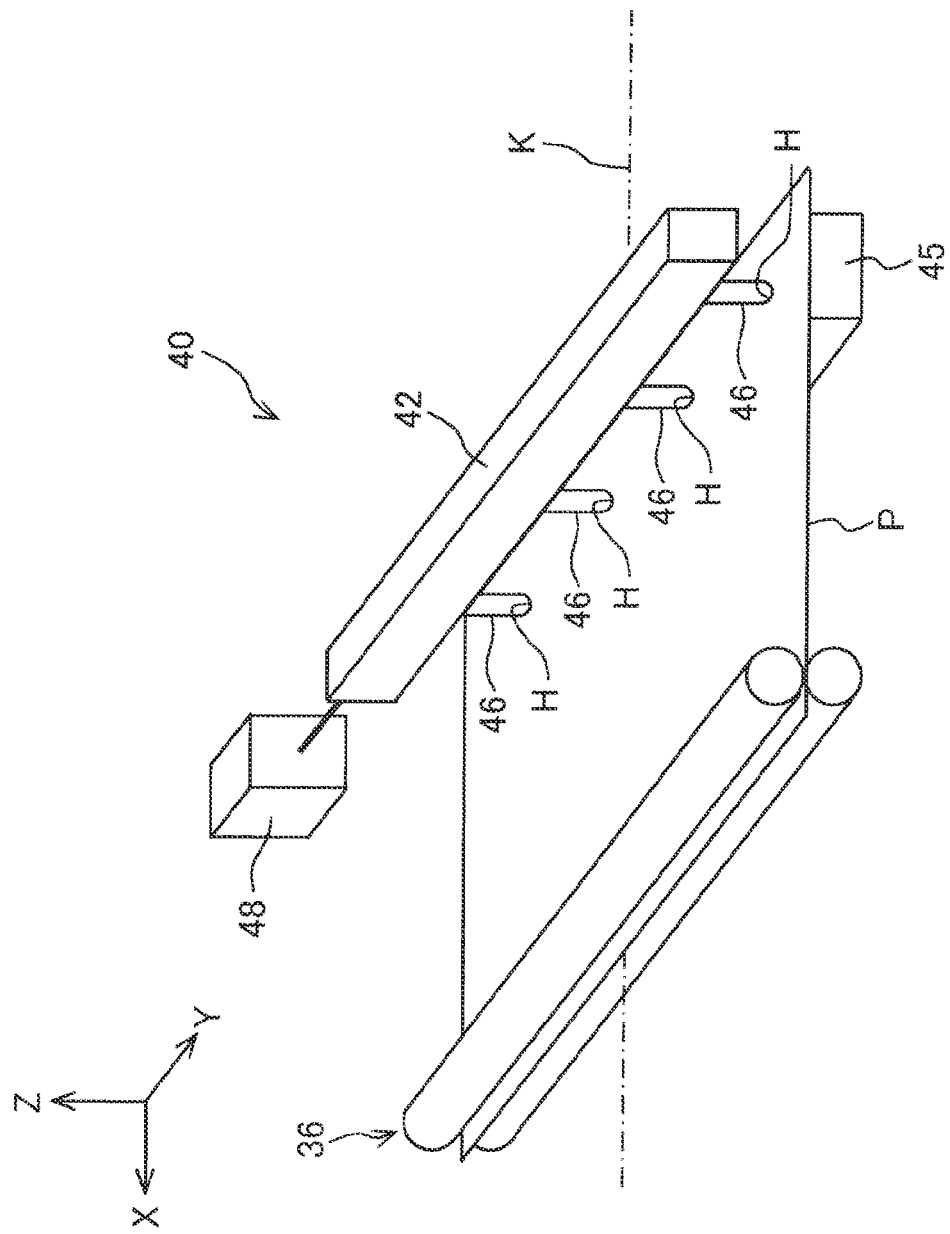
FIG. 3 is a perspective view of a punch unit of the recording system according to the first embodiment.

As illustrated in FIG. 3, the punch unit 40 includes a unit body 42, a die 45 as a pedestal portion, four punch members 46, and a driving portion 48. As an example of the punching processing, the punch unit 40 forms through holes H at four positions arranged in the Y direction at an end portion of the paper P in a −X direction.

The unit body 42 supports the punch members 46. Further, the unit main body 42 is provided with a rotating portion 43 and an elevating portion 44 (FIG. 2) therein.

The rotating portion 43 rotates the punch members 46 by 90° around a central axis along the Z direction when viewed in the Z direction. The presence or absence of rotation is determined based on the grain direction of the paper P and an arrangement direction of a blade portion 46A (FIG. 6) of the punch member 46.

The elevating portion 44 is configured to include an electromagnetic switch (not illustrated) and a cylinder (not illustrated), and raises and lowers the punch members 46 in the Z direction.

The rotating portion 43 and the elevating portion 44 may be integrated like a clamp cylinder.

Figure 6:
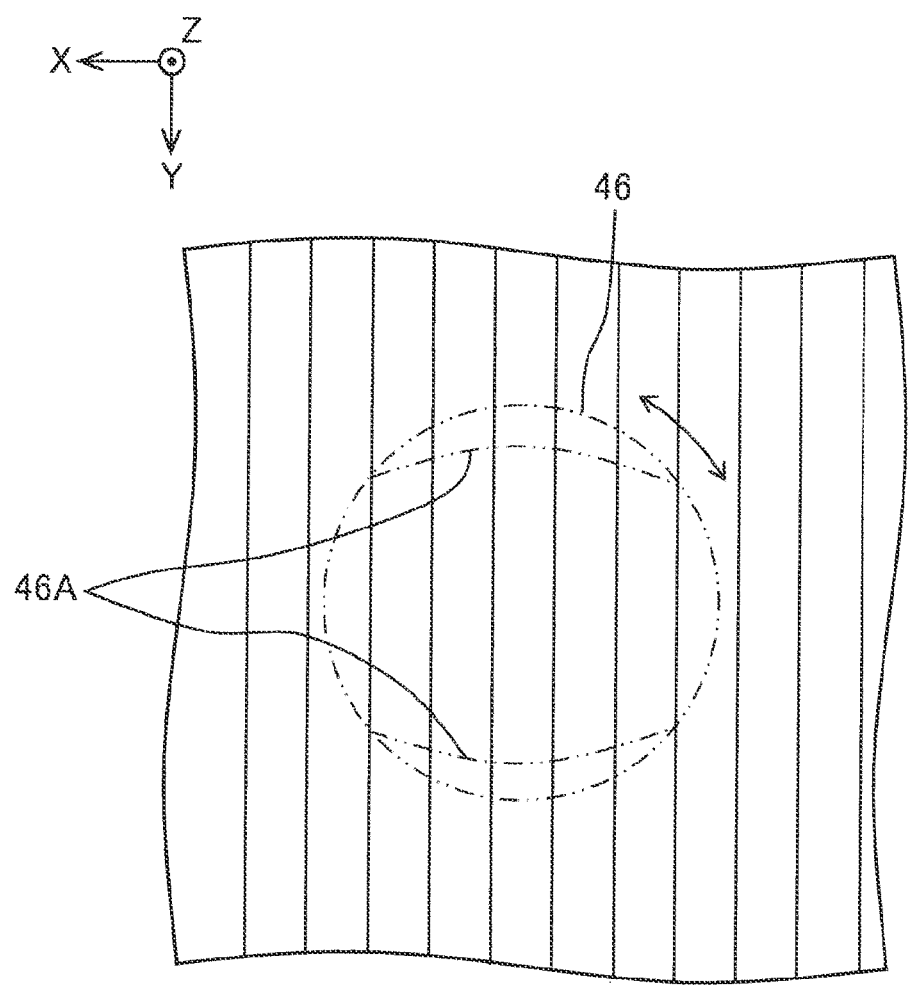
FIG. 6 is a schematic view illustrating a state in which a punch is rotated so that a direction of a punch blade intersects with a grain direction of paper in the recording system according to the first embodiment.

As illustrated in FIG. 6, the punch member 46 is formed in a cylindrical shape whose central axis is along the Z direction. Two blade portions 46A are formed at the ends of the punch member 46 in the −Z direction at intervals in the Y direction. The two blade portions 46A are rotatably provided around the central axis of the punch member 46. In FIG. 6, as an example, the two blade portions 46A extend substantially along the X direction as an example of one direction when viewed in the Z direction. Further, the two blade portions 46A extend in the X direction intersecting the Y direction along which the long grains of the paper P are aligned.

When the punch member 46 is driven in the −Z direction by the driving portion 48, the punch member 46 forms a through hole H (FIG. 3) by applying a shearing force in the −Z direction to the paper P on which the ink Q is discharged.

As illustrated in FIG. 2, the driving portion 48 includes a motor (not illustrated) and a cam (not illustrated), and drives the rotating portion 43 to rotate the blade portion 46A. Further, the driving portion 48 drives the elevating portion 44 to raise the punch member 46 in the +Z direction or lowers the punch member 46 in the −Z direction.

As illustrated in FIG. 4, in the paper P, the recordable area is referred to as a recordable area SA. In FIG. 4, the recordable area SA is represented by an alternate long and short dash line. Further, in FIG. 4, as an example, the paper P in the case of bordered printing is illustrated.

The four circular through holes H1, H2, H3, and H4 corresponding to the four punch members 46 (FIG. 3) are formed inside the recordable area SA. In the present embodiment, as an example, the recordable region SA is also set inside the four through holes H1, H2, H3, and H4. The through holes H1, H2, H3, and H4 are arranged in this order from the +Y direction to the −Y direction.

Figure 5:
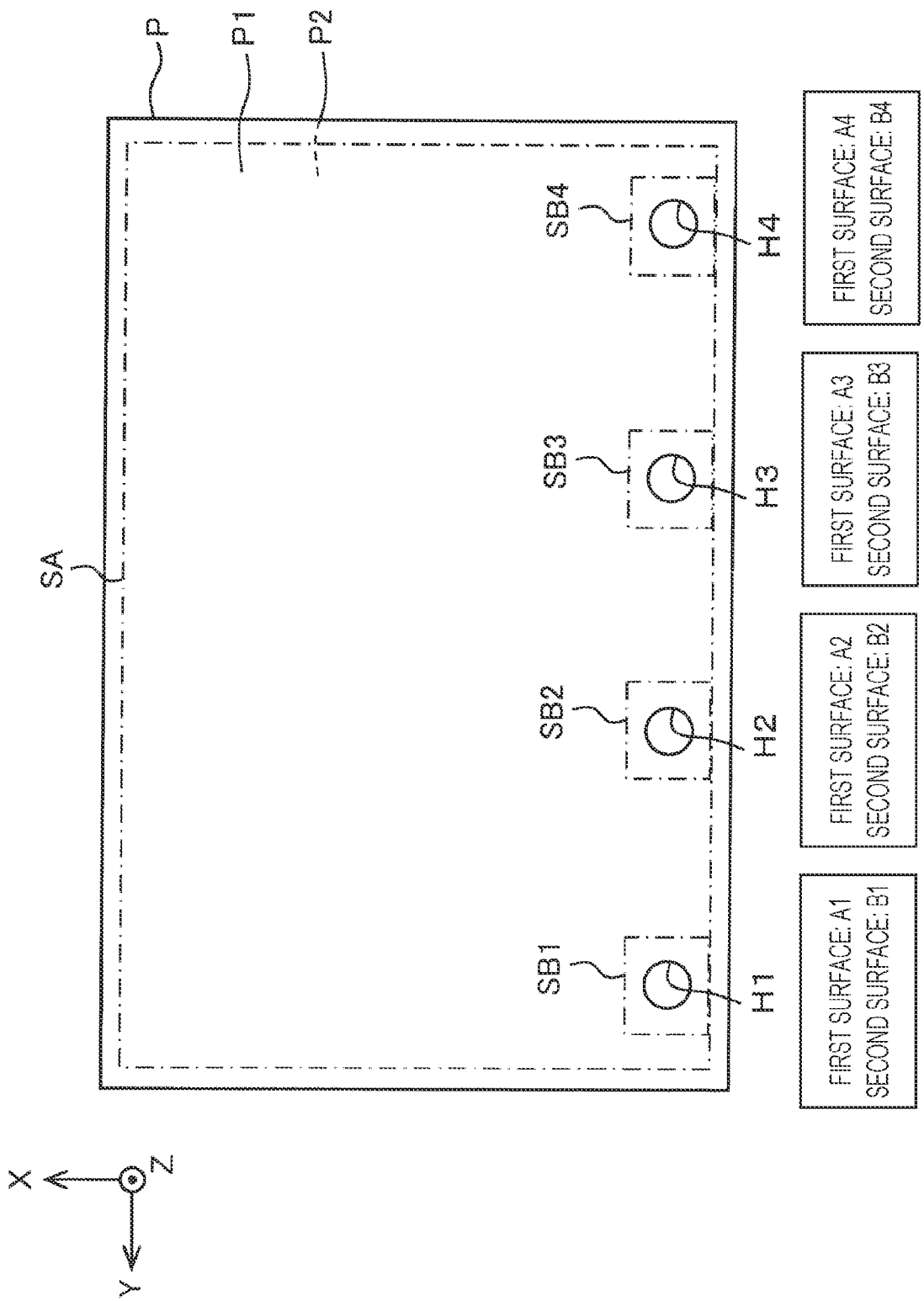
FIG. 5 is a schematic view illustrating a part of an image formed on a paper and a punching position of the paper in the recording system according to the first embodiment.

As illustrated in FIG. 5, as an example, among the areas where the through holes H1, H2, H3, and H4 are formed, a small rectangular area including only the area where the through hole H1 is formed is designated as a scheduled punching area SB1. Similarly, among the areas where the through holes H1, H2, H3, and H4 are formed, a small rectangular area including only the area where the through hole H2 is formed is designated as a scheduled punching area SB2, a small rectangular area including only the area where the through hole H3 is formed is designated as a scheduled punching area SB3 and a small rectangular area including only the area where the through hole H4 is formed is designated as a scheduled punching area SB4. In FIG. 5, the through holes H1, H2, H3, and H4 are represented by solid lines, but when the scheduled punching areas SB1, SB2, SB3, and SB4 are set, the through holes H1, H2, H3, and H4 are not formed. Further, the scheduled punching areas SB1, SB2, SB3, and SB4 are formed in the recordable area SA.

On the first surface P1, recording density of the scheduled punching area SB1 is A1, recording density of the scheduled punching area SB2 is A2, recording density of the scheduled punching area SB3 is A3, and recording density of the scheduled punching area SB4 is A4. On the second surface P2, recording density of the scheduled punching area SB1 is B1, recording density of the scheduled punching area SB2 is B2, recording density of the scheduled punching area SB3 is B3, and recording density of the scheduled punching area SB4 is B4.

The recording densities A1, A2, A3, A4, B1, B2, B3, and B4 are estimated by the recording density estimation portion 28 (FIG. 2).

Next, the control of the controller 24 of the first embodiment will be summarized. Regarding the reference numerals used in each portion of the recording system 1 and the paper P, the description of individual drawing numbers will be omitted by referring to FIGS. 1 to 6.

The controller 24 sets at least one of the number of punching and the punching speed per paper P in the punch unit 40 based on the information on the paper P, the recording information, and the environmental information as the setting information. Further, the controller 24 sets at least one of the number of punching and the punching speed as the recording information based on information on the recording density.

When the punch unit 40 performs the punching on the four scheduled punching areas SB, the controller 24 sets at least one of the number of punching and the punching speed based on the highest recording density among the recording densities A1, A2, A3, A4, B1, B2, B3, and B4 in the four scheduled punching areas SB1, SB2, SB3, and SB4. In the following description, as an example, the recording density A3 is the highest recording density and the recording density B2 is the lowest recording density among the above eight recording densities. The highest recording density on the second surface P2 is B3 as an example.

When the recording densities in the scheduled punching areas SB1, SB2, SB3, and SB4 are higher than a preset predetermined value C, the controller 24 increases the number of punching and the punching speed. In the first embodiment, as an example, the predetermined value C is set to a value less than the recording density B2.

The controller 24 uses at least one of temperature and humidity as the environmental information. In the present embodiment, as an example, the controller 24 uses both the temperature and the humidity as the environmental information. Further, the controller 24 uses the thickness of the paper P as the information on the paper P. Further, the controller 24 reduces at least one of the number of punching and the punching speed when the thickness of the paper P to be punched is a predetermined thickness t or more, and increases at least one of the number of punching and the punching speed when the thickness of the paper P is thinner than the predetermined thickness t.

The controller 24 uses the grain direction of the paper P as the information on the paper P. Further, the controller 24 rotates the blade portion 46A by the driving portion 48 so that the extending direction of the blade portion 46A and the grain direction intersect with each other in a state in which a mode for rotating the punch member 46 is selected.

The controller 24 increases at least one of the number of punching and the punching speed when double-sided printing of the first surface P1 and the second surface P2 is performed, as compared to at least one of the number of punching and the punching speed when single-sided printing of the first surface P1 or the second surface P2 is performed.

It is considered that when the double-sided printing is performed, the amount of water contained per unit area of paper P increases and the rigidity of paper P against the force acting in the punching direction decreases as compared with the case in which the single-sided printing is performed. Therefore, in the recording system 1, the poor punching is suppressed by increasing at least one of the number of punching and the punching speed.

The controller 24 can switch from one of a first punching mode and a second punching mode to the other.

When the mode is switched to the first punching mode, the controller 24 changes the setting of at least one of the number of punching and the punching speed based on the setting information described above.

When the mode is switched to the second punching mode, the controller 24 does not change the settings of the number of punching and the punching speed.

That is, in the recording system 1, as an example, the user can select the first punching mode in which the controller 24 changes the settings of the number of punching and the punching speed, and the second punching mode in which the number of punching and the punching speed are not forcibly changed. The selection of the first punching mode and the second punching mode by the user is performed through the external device of the recording system 1 or through the manipulation portion 15.

FIG. 7 illustrates an example of each parameter set in the recording system 1.

As the recording surface of the paper P, one side and both sides can be selected.

The thickness of the paper P is set to 75 g/m$^2$ and 90 g/m$^2$ as a boundary value of a basis weight, and three types of thickness can be selected.

As the grain direction of the paper P, a long grain and a short grain can be selected.

The size of the paper P is set to 216 mm as a boundary value, and two types of sizes can be selected.

Four kinds of temperature ranges including temperatures of 18° C., 25° C., and 35° C. as boundary values can be selected.

Three types of humidity ranges including humidity of 35%, 45%, and 85% as boundary values can be selected.

As the number of punching, 1, 2, 3, and 4 times can be selected.

The punching speed is a moving speed of the punch member 46 at the time of punching, and a normal speed, which is 1× speed, and a 2× speed can be selected.

FIG. 8 illustrates an example of a table illustrating punching parameters in a case of single-sided printing in which recording is performed only on the first surface P1 in the recording system 1. A plurality of tables of punching parameters as illustrated in FIG. 8 are provided. Based on each parameter set in the recording system 1, the table illustrating the punching parameters to be referred to is changed. More specifically, the table of punching parameters to be referred to is changed depending on the parameters used among the parameters illustrated in FIG. 7 and their numerical values. In the first embodiment, a maximum value of the recording density on the paper P is selected as an example.

The number of punching is the number of punching processing performed when forming one through hole H. For example, when the number of punching is two, it means that the punching processing is continuously performed twice when forming one through hole H.

When the recording density is less than 30%, the number of punching is set to one. When the recording density is 30% or more and less than 70%, the number of punching is set to two consecutive times. When the recording density is 70% or more, the number of punching is set to three consecutive times.

Further, when the recording density is less than 30%, the punching speed is 1 times a standard normal speed. When the recording density is 30% or more, the punching speed is twice the normal speed.

FIG. 9 illustrates, as an example, a table illustrating punching parameters in a case of double-sided printing in which recording is performed on the first surface P1 and the second surface P2 in the recording system 1. Similarly to FIG. 8, FIG. 9 is also an example of a table in which a plurality of punching parameters are provided. As in FIG. 8, it is assumed that the maximum value of the recording density on the paper P is selected.

When the recording density is less than 30%, the number of punching is set to one. When the recording density is 30% or more and less than 70%, the number of punching is set to two consecutive times. When the recording density is 70% or more and less than 80%, the number of punching is set to three consecutive times. When the recording density is 90% or more, the number of punching is set to four consecutive times.

Further, when the recording density is less than 20%, the punching speed is 1 times of a normal speed. When the recording density is 20% or more, the punching speed is twice of the normal speed.

Next, an operation of the recording system 1 of the first embodiment will be described.

Figure 10:
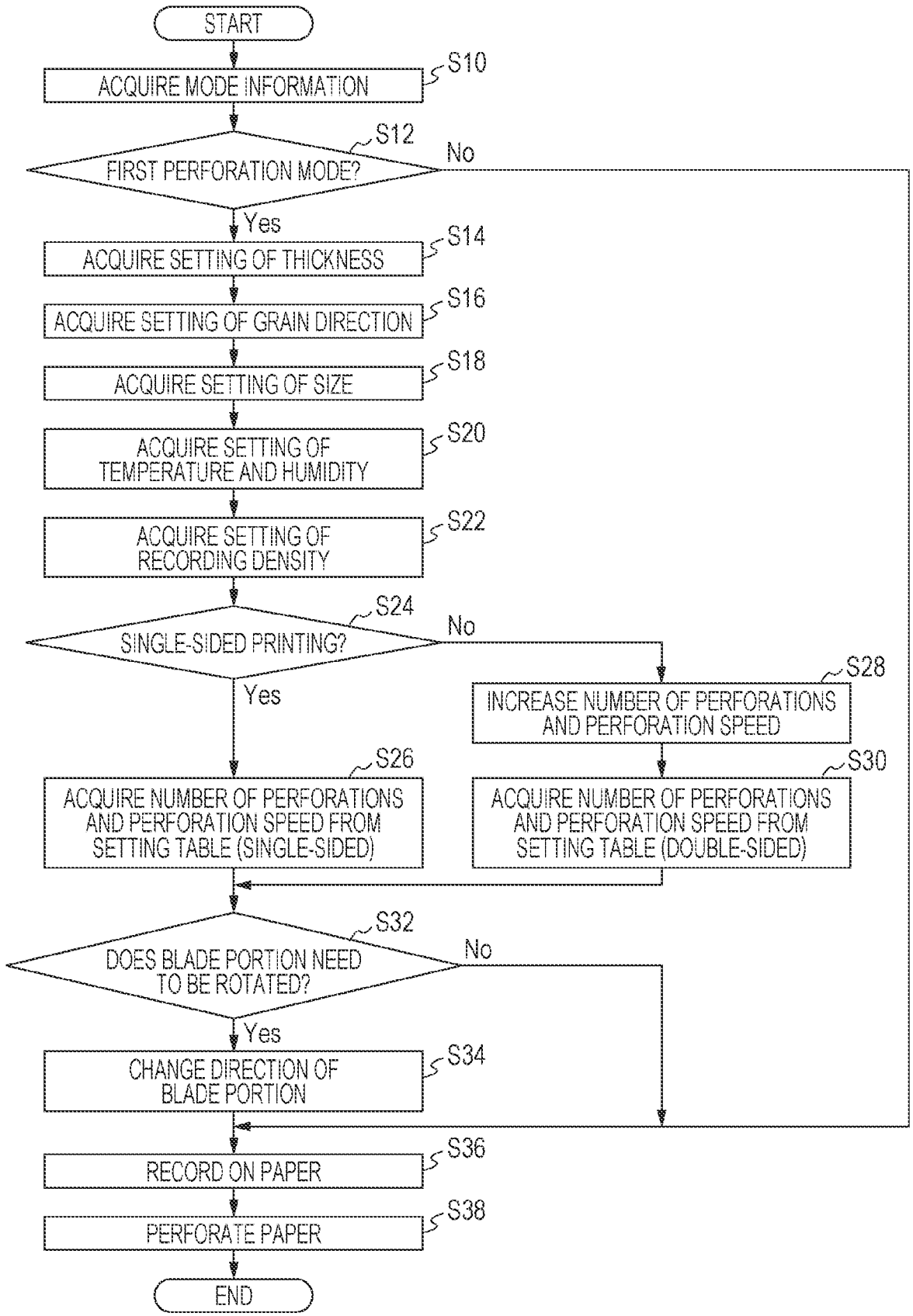
FIG. 10 is a flowchart illustrating a flow of each processing executed in the recording system of the first embodiment.

FIG. 10 is a flowchart illustrating a flow of each processing in the first punching mode in which the number of punching and the punching speed in the paper P are changed according to each setting information, and the second punching mode in which the number of punching and the punching speed are not changed. For each portion constituting the recording system 1 and each parameter used in the recording system 1, the description of individual drawing numbers will be omitted by referring to FIGS. 1 to 9.

Each processing illustrated in FIG. 10 is performed by the CPU 25 reading and expanding the program PR from the memory 26 and executing the program PR. It is assumed that the recording information has already been transmitted to the controller 24 by being read by the external device or the scanner portion 12, and the recording density estimation portion 28 has obtained setting information on the recording density.

In step S10, the CPU 25 acquires mode information from the manipulation portion 15. Then, the processing proceeds to step S12.

In step S12, the CPU 25 determines whether or not a first punching mode is selected based on the acquired mode information. When the first punching mode is selected (S12: Yes), the processing proceeds to step S14. When a second punching mode is selected (S12: No), the processing proceeds to step S36.

In step S14, the CPU 25 acquires setting information on the thickness of the paper P from the manipulation portion 15. Then, the processing proceeds to step S16.

In step S16, the CPU 25 acquires setting information on the grain direction of the paper P from the manipulation portion 15. Then, the processing proceeds to step S18.

In step S18, the CPU 25 acquires setting information on the size of the paper P from the manipulation portion 15. Then, the processing proceeds to step S20.

In step S20, the CPU 25 acquires setting information on the temperature and the humidity from the temperature sensor 21 and the humidity sensor 23. Then, the processing proceeds to step S22.

In step S22, the CPU 25 acquires setting information on the recording density from the recording density estimation portion 28. Then, the processing proceeds to step S24.

In step S24, the CPU 25 acquires setting information on the printing surface from the manipulation portion 15 and determines whether the printing is single-sided printing or double-sided printing. When the printing is the single-sided printing (S24: Yes), the processing proceeds to step S26. When the printing is the double-sided printing (S24: No), the processing proceeds to step S28.

In step S26, the CPU 25 determines a setting table (one side) to be referred to by using each setting information on the thickness, size, temperature and humidity, and recording density of the paper P, and sets the number of punching and the punching speed in the punch unit 40 from the setting table (one side). Then, the processing proceeds to step S32.

In step S28, the CPU 25 increases the number of punching and the punching speed in the double-sided printing more than the number of punching and punching speed in the single-sided printing. Then, the processing proceeds to step S30.

In step S30, the CPU 25 determines a setting table (double-sided) to be referred to by using each setting information on the thickness, size, temperature and humidity, and recording density of the paper P, and sets the number of punching and the punching speed in the punch unit 40 from the setting table (double-sided). Then, the processing proceeds to step S32.

In step S32, the CPU 25 determines whether or not the blade portion 46A needs to be rotated based on the setting information in the grain direction. When the blade portion 46A needs to be rotated (S32: Yes), the processing proceeds to step S34. When the blade portion 46A does not need to be rotated (S32: No), the processing proceeds to step S36.

In step S34, the CPU 25 changes the direction of the blade portion 46A by controlling the driving of the rotating portion 43 to rotate the punch member 46. The rotation angle is 90° as an example. Then, the processing proceeds to step S36.

In step S36, the CPU 25 performs the recording on the transported paper P using the recording head 20. Then, the processing proceeds to step S38.

In step S38, the CPU 25 executes the punching on the paper P by controlling the driving of the elevating portion 44 to lower the punch member 46. The punched paper P is transported to the discharge portion 33. Here, since the number of punching and the punching speed are set according to the rigidity, which is one of the states of the paper P, poor punching can be suppressed. Then, the program PR is terminated.

When the next paper P is punched, processing may be started from step S10.

As described above, according to the post-processing unit 30, by setting at least one of the number of punching and the punching speed according to the rigidity of the paper P, for example, even when the paper P has a low rigidity, since holes can be easily formed in the paper P by increasing the number of punching or the punching speed, the poor punching in the paper P can be suppressed.

When the recording density is high, the amount of ink Q attached to the paper P increases. When the recording density is low, the amount of ink Q attached to the paper P decreases. Here, according to the post-processing unit 30, since punching can be performed according to the amount of ink Q in the paper P by setting at least one of the number of punching and the punching speed based on the recording density, the poor punching in the paper P can be suppressed.

According to the post-processing unit 30, since at least one of the number of punching and the punching speed is set according to a position where the poor punching is most likely to occur, the poor punching in the paper P can be suppressed.

According to the post-processing unit 30, since at least one of the number of punching and the punching speed is increased even when the possibility that the poor punching occurs increases due to the increase in the recording density, the poor punching can be suppressed.

According to the post-processing unit 30, when productivity is reduced due to the increase in the number of punching, the productivity can be maintained by increasing the punching speed, so that the number of punching can be increased while maintaining the productivity.

According to the post-processing unit 30, by using the temperature and the humidity as the environmental information, the poor punching can be further suppressed.

According to the post-processing unit 30, by using the thickness of the paper P as the information on the paper P, the poor punching can be further suppressed.

According to the post-processing unit 30, by setting at least one of the number of punching and the punching speed in consideration of the thickness of the paper P, the poor punching can be further suppressed.

According to the post-processing unit 30, by using the grain direction as the information on the paper P, the poor punching can be further suppressed.

According to the post-processing unit 30, since the paper P is easily cut by intersecting the grain direction and one direction of the blade portion 46A, the poor punching can be further suppressed.

According to the post-processing unit 30, by setting at least one of the number of punching and the punching speed in consideration of the information on the recording surface as the recording information, the poor punching can be further suppressed. Specifically, in the case of double-sided printing, since at least one of the number of punching and the punching speed is increased as compared with the case of single-sided printing, the poor punching can be suppressed even when the amount of water of the paper P increases and the rigidity of the paper P decreases.

According to the post-processing unit 30, for example, when the user prioritizes high productivity over quality of punching, it is possible to prevent a decrease in productivity by switching the mode to the second punching mode.

According to the recording system 1, the same operations and effects as those of the post-processing unit 30 can be obtained.

Second Embodiment

Next, a recording system 1 and a post-processing unit 30 of a second embodiment will be described with reference to the accompanying drawings. The portions common to each portion of the recording system 1 and each portion of the post-processing unit 30 of the first embodiment are designated by the same reference numerals, and the description thereof will be omitted.

The recording system 1 and the post-processing unit 30 of the second embodiment differ in the handling of the recording densities on the first surface P1 and the second surface P2 in the recording system 1 and the post-processing unit 30 of the first embodiment. The configurations other than the handling of the recording densities on the first surface P1 and the second surface P2 are the same as the configurations of the first embodiment. Therefore, the description of individual drawing numbers is omitted for FIGS. 1 to 10.

When the recording unit 2 performs recording on the first surface P1 and the second surface P2 of the paper P, the controller 24 of the second embodiment obtains an average value M1 of the first recording density A1 in the scheduled punching area SB1 on the first surface P1 and the second recording density B1 in the scheduled punching area SB1 on the second surface P2. Similarly, the controller 24 obtains an average value M2 of the first recording density A2 and the second recording density B2 in the scheduled punching area SB2, an average value M3 of the first recording density A3 and the second recording density B3 in the scheduled punching area SB3, and an average value M4 of the first recording density A4 and the second recording density B4 in the scheduled punching area SB4. The average values M1, M2, M3, and M4 are not illustrated. Further, it is assumed that the average value M3 is the highest value.

The controller 24 sets at least one of the number of punching and the punching speed based on the average values M1, M2, M3, and M4. Specifically, when the punch unit 40 performs the punching on the four scheduled punching areas SB1, SB2, SB3, and SB4, the controller 24 sets at least one of the number of punching and the punching speed based on the highest average value M3.

When the average values M1, M2, M3, and M4 in the scheduled punching areas SB1, SB2, SB3, and SB4 are higher than a predetermined value C, the controller 24 increases at least one of the number of punching and the punching speed. Here, as an example, it is assumed that the average value M3 is higher than the predetermined value C.

Next, the operations of the recording system 1 and the post-processing unit 30 of the second embodiment will be described.

Figure 11:
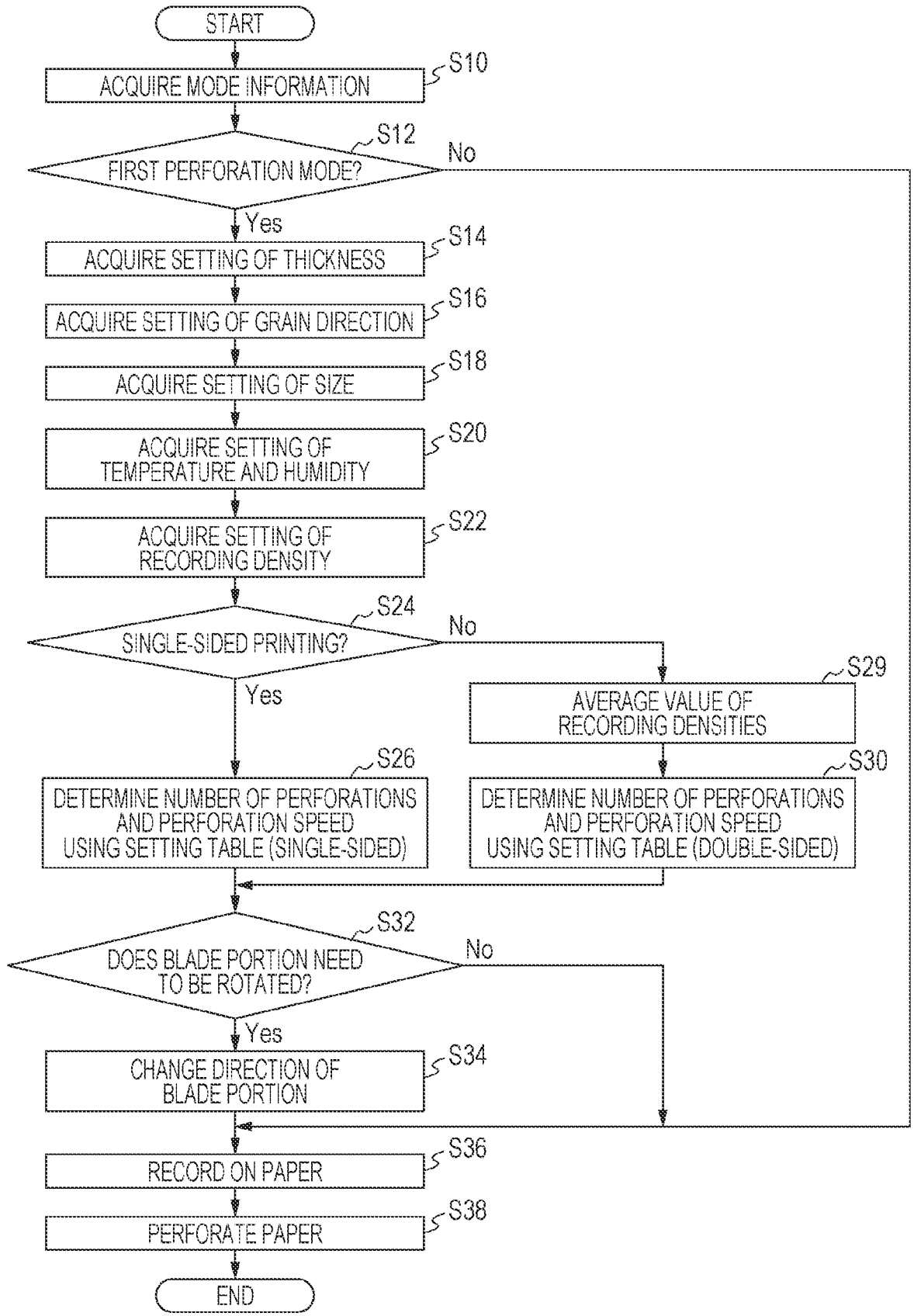
FIG. 11 is a flowchart illustrating a flow of each processing executed in a recording system of a second embodiment.

FIG. 11 is a flowchart illustrating a flow of each processing in the recording system 1 and the post-processing unit 30 of the second embodiment. The changes from the first embodiment are that step S28 (FIG. 10) is replaced with step S29 and that the average value M is used in step S30. Therefore, steps S29 and S30 will be described, and the description of other steps will be omitted.

When the double-sided printing is determined in step S24, the processing proceeds to step S29.

In step S29, the CPU 25 obtains the above-mentioned average values M1, M2, M3, and M4. Here, it is assumed that the highest average value M3 is selected as a representative value. Then, the processing proceeds to step S30.

In step S30, the CPU 25 determines a setting table (double-sided) to be referred to by using each setting information on the thickness, size, temperature and humidity, and the average value M3 of the recording density of the paper P, and sets the number of punching and the punching speed in the punch unit 40 from the setting table (double-sided). Then, the processing proceeds to step S32.

According to the recording system 1 and the post-processing unit 30 of the second embodiment, since at least one of the number of punching and the punching speed is set based on not only the first recording density A of the first surface P1 but also the second recording density B of the second surface P2, the poor punching in the paper P can be suppressed compared with the configuration in which the punching is performed based only on the first recording density A.

Further, on the first surface P1 and the second surface P2, since at least one of the number of punching and the punching speed is set based on the average value M3 of the recording densities of the scheduled punching area SB3, which is the position where the possibility of poor punching is highest, respectively, the poor punching in the paper P can be suppressed.

Further, when the average value M of the recording densities is high and there is a high possibility that the poor punching occurs, at least one of the number of punching and the punching speed is increased, so that the poor punching in the paper P can be suppressed.

The recording system 1 and the post-processing unit 30 according to the first and second embodiments of the present disclosure are basically having the configuration as described above, but, for example, it is also possible to change or omit a partial configuration within a range that does not deviate from the gist of the present disclosure.

In the post-processing unit 30 of the first and second embodiments, two of the information on the paper P, the recording information, and the environmental information may be used and the remaining one may not be used, or only one thereof may be used. For example, the number of punching and the punching speed may be set based only on the environmental information on the temperature or the humidity regardless of the information on the paper P and the recording density.

The controller 24 may set only one of the number of punching and the punching speed. Further, the controller 24 may perform control to reduce the number of punching and the punching speed based on the control information. Further, the controller 24 may determine the number of punching and the punching speed based on only one of the temperature and the humidity.

The paper P is not limited to the long grain, and paper having a short grain may be used.

The number of through holes is not limited to four, and may be any one from one to three, or five or more. The shape of the through holes H1, H2, H3, and H4 is not limited to a circular shape, and may be an elliptical shape or a polygonal shape.

The maximum recording density is not limited to the scheduled punching area SB3, and may be other areas.

When the punching is performed a plurality of times, the punching speed is not limited to a constant value each time, and the punching speed may be gradually increased or the punching speed may be gradually decreased.

What is claimed is:

1. A post-processing device comprising:
a punching portion that punches a medium on which recording is performed by a recording portion that discharges a liquid; and
a controller that controls a punching operation of the punching portion, wherein
the controller sets at least one of a number of punching and a punching speed per medium in the punching portion based on setting information of at least one of recording information or environmental information in the recording portion,
the recording information includes information on a recording density of a scheduled punching area in the medium, and
the controller sets at least one of the number of punching and the punching speed based on the information on the recording density.

2. The post-processing device according to claim 1, wherein
the setting information further includes information on the medium related to a rigidity of the medium.

3. The post-processing device according to claim 2, wherein
the controller uses a thickness of the medium as information on the medium.

4. The post-processing device according to claim 3, wherein
the controller reduces at least one of the number of punching and the punching speed when the thickness of the medium to be punched is a predetermined thickness or more, and increases at least one of the number of punching and the punching speed when the thickness of the medium to be punched is thinner than the predetermined thickness.

5. The post-processing device according to claim 2, wherein
the medium has a long grain or a short grain, and
the controller uses a grain direction of the medium as information on the medium.

6. The post-processing device according to claim 5, wherein
the punching portion has a blade portion that is rotatably provided and extends in one direction when viewed in a punching direction, and a driving portion that rotates the blade portion, and
the controller rotates the blade portion by the driving portion so that the one direction and the grain direction intersect.

7. The post-processing device according to claim 1, wherein
when the punching portion performs punching for a plurality of the scheduled punching areas, the controller sets at least one of the number of punching and the punching speed based on the highest recording density among recording densities in the scheduled punching areas.

8. The post-processing device according to claim 1, wherein
when recording is performed by the recording portion on a first surface and a second surface opposite to the first surface of the medium, the controller sets at least one of the number of punching and the punching speed, based on an average value of a first recording density in the scheduled punching area on the first surface and a second recording density in the scheduled punching area on the second surface.

9. The post-processing device according to claim 8, wherein
when the punching portion performs punching for a plurality of the scheduled punching areas, the controller sets at least one of the number of punching and the punching speed based on the highest average value among a plurality of the average values.

10. The post-processing device according to claim 8, wherein
when the average value in the scheduled punching area is higher than a predetermined value, the controller increases at least one of the number of punching and the punching speed.

11. The post-processing device according to claim 10, wherein
the controller increases the number of punching and the punching speed.

12. The post-processing device according to claim 1,
when the recording density in the scheduled punching area is higher than a predetermined value, the controller increases at least one of the number of punching and the punching speed.

13. The post-processing device according to claim 1, wherein
the controller uses at least one of temperature and humidity as the environmental information.

14. The post-processing device according to claim 1, wherein
the recording portion is configured to perform single-sided printing in which printing is performed on a first surface or a second surface opposite to the first surface of the medium by the recording portion, and double-sided printing in which recording is performed on both the first surface and the second surface,
the single-sided printing or the double-sided printing is selected as the recording information, and
the controller increases at least one of the number of punching and the punching speed when the double-sided printing is performed as compared to at least one of the number of punching and the punching speed when the single-sided printing is performed.

15. The post-processing device according to claim 1, wherein
the controller is configured to switch from one of a first punching mode and a second punching mode to another of the first punching mode and the second punching mode,
when the mode is switched to the first punching mode, the controller changes a setting of at least one of the number of punching and the punching speed based on the setting information, and
when the mode is switched to the second punching mode, the controller does not change settings of the number of punching and the punching speed.

16. A printing device comprising:
the post-processing device according to claim 1; and
the recording portion that performs recording on the medium to be transported to the post-processing device.

17. A post-processing device comprising:
a punching portion that punches a medium on which recording is performed by a recording portion that discharges a liquid; and
a controller that controls a punching operation of the punching portion, wherein
the controller sets at least one of a number of punching and a punching speed per medium in the punching portion based on setting information of at least one of recording information or environmental information in the recording portion,
the recording portion is configured to perform single-sided printing in which printing is performed on a first surface or a second surface opposite to the first surface of the medium by the recording portion, and double-sided printing in which recording is performed on both the first surface and the second surface,
the single-sided printing or the double-sided printing is selected as the recording information, and
the controller increases at least one of the number of punching and the punching speed when the double-sided printing is performed as compared to at least one of the number of punching and the punching speed when the single-sided printing is performed.

18. A post-processing device comprising:
a punching portion that punches a medium on which recording is performed by a recording portion that discharges a liquid; and
a controller that controls a punching operation of the punching portion, wherein
the controller sets a number of punching per medium in the punching portion based on setting information of at least one of recording information or environmental information in the recording portion,
the number of punching is the number of punching processing performed when forming one thorough hole on a given medium,
the controller is configured to switch from one of a first punching mode and a second punching mode to another of the first punching mode and the second punching mode,
when the mode is switched to the first punching mode, the controller changes a setting of at least one of the number of punching and the punching speed based on the setting information, and
when the mode is switched to the second punching mode, the controller does not change settings of the number of punching and the punching speed.

* * * * *